(12) United States Patent
Rines

(10) Patent No.: US 9,599,875 B2
(45) Date of Patent: Mar. 21, 2017

(54) FIVE-WAVE OPTICAL PARAMETRIC OSCILLATOR WITH V-RING GEOMETRY

(71) Applicant: BAE SYSTEMS INFORMATION AND ELECTRONIC SYSTEMS INTEGRATION INC., Nashua, NH (US)

(72) Inventor: Nathan E. Rines, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/854,646

(22) Filed: Sep. 15, 2015

(65) Prior Publication Data

US 2016/0079726 A1 Mar. 17, 2016

Related U.S. Application Data

(60) Provisional application No. 62/050,818, filed on Sep. 16, 2014.

(51) Int. Cl.
*G02F 1/35* (2006.01)
(52) U.S. Cl.
CPC .... *G02F 1/3532* (2013.01); *G02F 2001/3542* (2013.01)

(58) Field of Classification Search
None
See application file for complete search history.

(56) References Cited

U.S. PATENT DOCUMENTS

| 5,751,472 | A | * | 5/1998 | Jeys | G02F 1/39 359/326 |
| 6,295,160 | B1 | * | 9/2001 | Zhang | G02F 1/39 359/330 |
| 6,344,920 | B1 | * | 2/2002 | Fukumoto | G02F 1/39 359/330 |
| 7,079,557 | B1 | | 7/2006 | Yin et al. | |
| 2011/0075690 | A1 | * | 3/2011 | Creeden | G02F 1/3534 372/21 |

* cited by examiner

*Primary Examiner* — Hemang Sanghavi
(74) *Attorney, Agent, or Firm* — Davis & Bujold, PLLC; Daniel J. Long; Scott J. Asmus

(57) ABSTRACT

An optical apparatus to provide several light bands on a single coaligned beam line or axis. The apparatus generally comprises five main components: a pump, a fold mirror, an input coupler, a nonlinear optical (NLO) crystal, and an output coupler. Alternatively, the present invention may comprise four main components, namely, a pump, an acute porro prism, a NLO crystal, and an input-output coupler. The pump input beam makes two passes through the nonlinear optical crystal and generates two new colors, having different wavelengths, during each pass through the nonlinear optical crystal.

11 Claims, 2 Drawing Sheets

FIVE-WAVE OPTICAL PARAMETRIC OSCILLATOR WITH V-RING GEOMETRY

FIELD OF THE INVENTION

The present invention relates to optical apparatuses and elements. More particularly, the present invention relates to parametric oscillators for generating a plurality of beams from a single input beam which are particularly useful in military and space applications.

BACKGROUND OF THE INVENTION

The prior art discloses a number of optical parametric oscillators.

For example, Espen Lippert et al. published an article, on 2 Dec. 2010 in Optics Express, entitled, "A 22-watt mid-infrared optical parametric oscillator with V-shaped 3-mirror ring resonator." This publication concerns an optical parametric oscillator (OPO) ring resonator used for power scaling of mid-wave infrared (MWIR) coherent sources. The apparatus uses a V-shaped 3-mirror ring resonator to allow two passes of the beams through a nonlinear crystal to achieve 22 W of output power.

U.S. Pat. No. 7,079,557 relates an intracavity OPO laser. The apparatus overlaps an OPO cavity with a laser resonator cavity with a nonlinear optical crystal (NLO) in the overlapping region. Using mirrors, the wavelengths are all reflected through the NLO crystal and the target wavelength beam is separated from the fundamental wavelength beam.

An improved way, however, is still necessary to achieve five separate output wavelengths all aligned on a single beam line.

SUMMARY OF THE INVENTION

Wherefore, it is an object of the present invention to overcome the above mentioned shortcomings and drawbacks associated with the prior art and provide an optical apparatus which can generate five separate beams, from a single pump input beam, which are each arranged on a single beam line, i.e., co-aligned with one another, and each separate beam has a different color and wavelength from the other beams.

Another object of the present invention is to provide several light bands on a single beam line. The present invention generally comprises five main components, namely, a pump, a fold mirror, an input coupler, a NLO crystal, and an output coupler. Alternatively, the present invention comprises, namely, a pump, an acute porro prism, a NLO crystal, and an input-output coupler.

A further object of the present invention is to generate a fourth and/or a fifth output band, while minimizing the associated costs and system complexity by using only a single OPO and a single nonlinear optical crystal and without using a beam splitter and a beam combiner.

Yet another object of the present invention is to mount the NLO crystal on a rotatable support so the orientation of a c-axis, of the mounted NLO crystal, forms an angle of between about 45 and about 60 degrees with respect to the axis of the pump input beam, while the rotatable support assists with incrementally altering the orientation of the mounted NLO crystal, as well as its c-axis, relative to the axis of the pump input beam and modifying the color and/or wavelength of the beams to be generated.

Still another object of the present invention is to mount the NLO crystal on a rotatable support so an orientation of the mounted NLO crystal is rotatable or movable, relative to the optical axis of the pump input beam, and the critical angle of the NLO crystal with respect to the pump input beam can be easily incrementally altered or modified.

A further object of the present invention is to arrange the optical apparatus so that the pump input beam, supplied by the pump, makes at least first and second passes through the NLO crystal, in opposite directions, with the pump input beam generating first and second light beams, during the first pass through the NLO crystal, and the pump input beam generating third and fourth light beams, during the second pass through the NLO crystal.

The present invention relates to an optical apparatus for generating up to five light bands aligned on a single beam line, the optical apparatus comprising: a pump for generating a pump input beam and supplying the pump input beam to a first surface of a nonlinear optical crystal for generating a first signal wavelength and a first idler wavelength, as the pump input beam makes a first pass through the nonlinear optical crystal; an input coupler being arranged between the pump and the first surface of the nonlinear optical crystal; a pair of reflective surfaces being arranged for reflecting at least a remaining portion of the pump input beam, which passes through and exits from a second surface of the nonlinear optical crystal, back through the second surface of the nonlinear optical crystal for a second pass through the nonlinear optical crystal and generating a second signal wavelength and a second idler wavelength, which are both coaligned with the remaining portion of the pump input beam, the first signal wavelength and the first idler wavelength.

The present invention also relates to a method of generating up to five light bands aligned on a single beam line via an optical apparatus in which the optical apparatus comprises a pump for generating a pump input beam, a nonlinear optical crystal for generating a first signal wavelength and a first idler wavelength during a first pass therethrough, and generating a second signal wavelength and a second idler wavelength during a second pass therethrough, an input coupler arranged between the pump and the first surface of the nonlinear optical crystal, and a pair of reflective surfaces arranged for reflecting at least the pump input beam, the first signal wavelength and the first idler wavelength back through the second surface of the nonlinear optical crystal for a second pass through the nonlinear optical crystal, the method comprising: generating the pump input beam via the pump; supplying the pump input beam to a first surface of a nonlinear optical crystal for generating the first signal wavelength and the first idler wavelength, as the pump input beam makes the first pass through the nonlinear optical crystal; reflecting at least the pump input beam, the first signal wavelength and the first idler wavelength toward a second surface of the nonlinear optical crystal for the second pass through the nonlinear optical and generating, from the pump input beam, the second signal wavelength and the second idler wavelength during the second pass through the nonlinear optical crystal.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
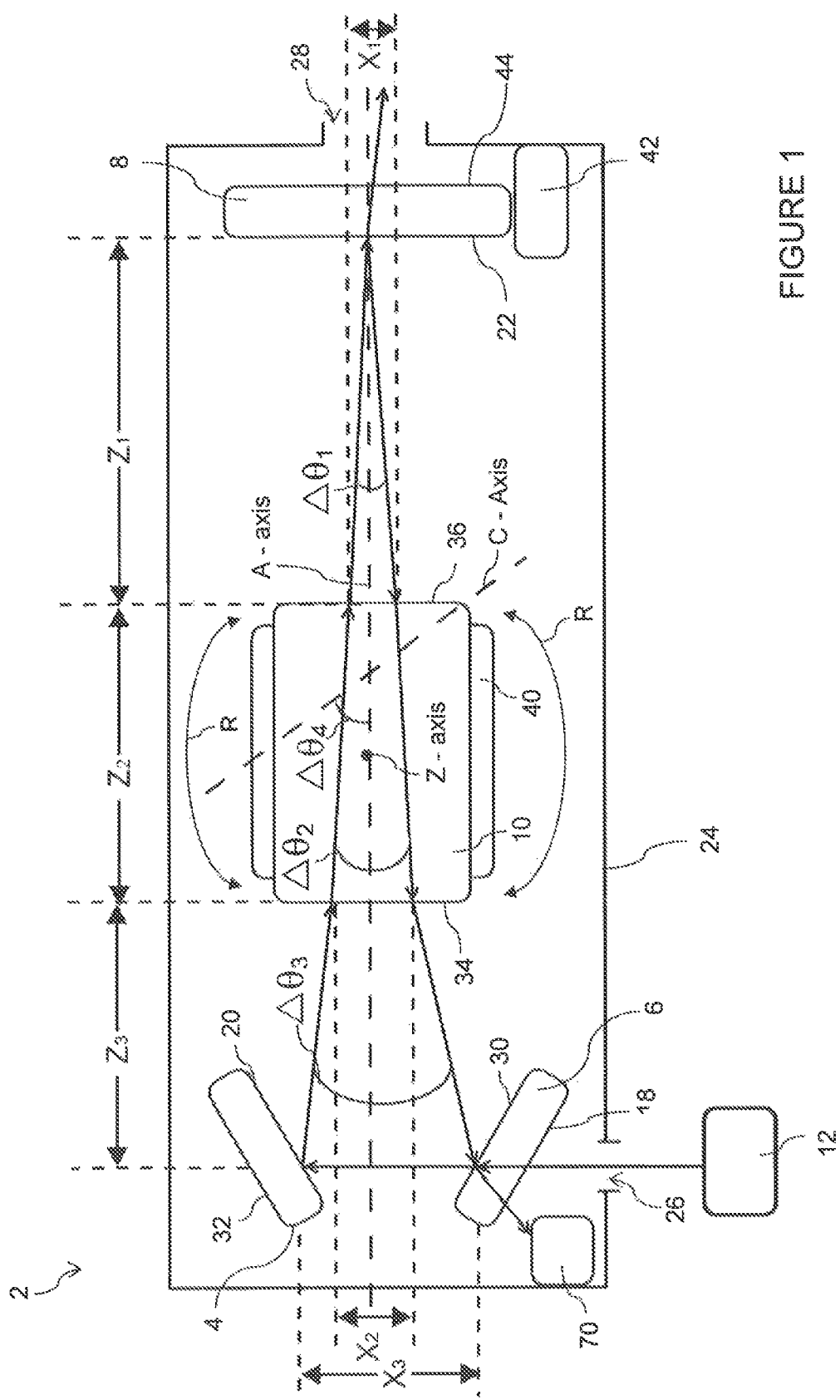
FIG. 1 is a schematic diagram of a first embodiment of the present invention shown approximately to scale.

Turning now to FIG. 1, a brief description concerning the various components of the present invention will now be briefly discussed. As can be seen in this diagrammatical representation, a first embodiment of optical apparatus 2, according to the present invention, comprises a fold mirror 4, an input coupler 6, an output coupler 8 and a NLO crystal 10. A pump 12 is arranged for emitting a desired input beam through an inlet opening 26 of the optical apparatus 2. As diagrammatically shown in this Figure, the various beams are shown as they propagate through the optical apparatus 2. This figure shows one embodiment of the present invention as optimized for a specific MWIR laser beam and a NLO crystal 10.

Figure 2:
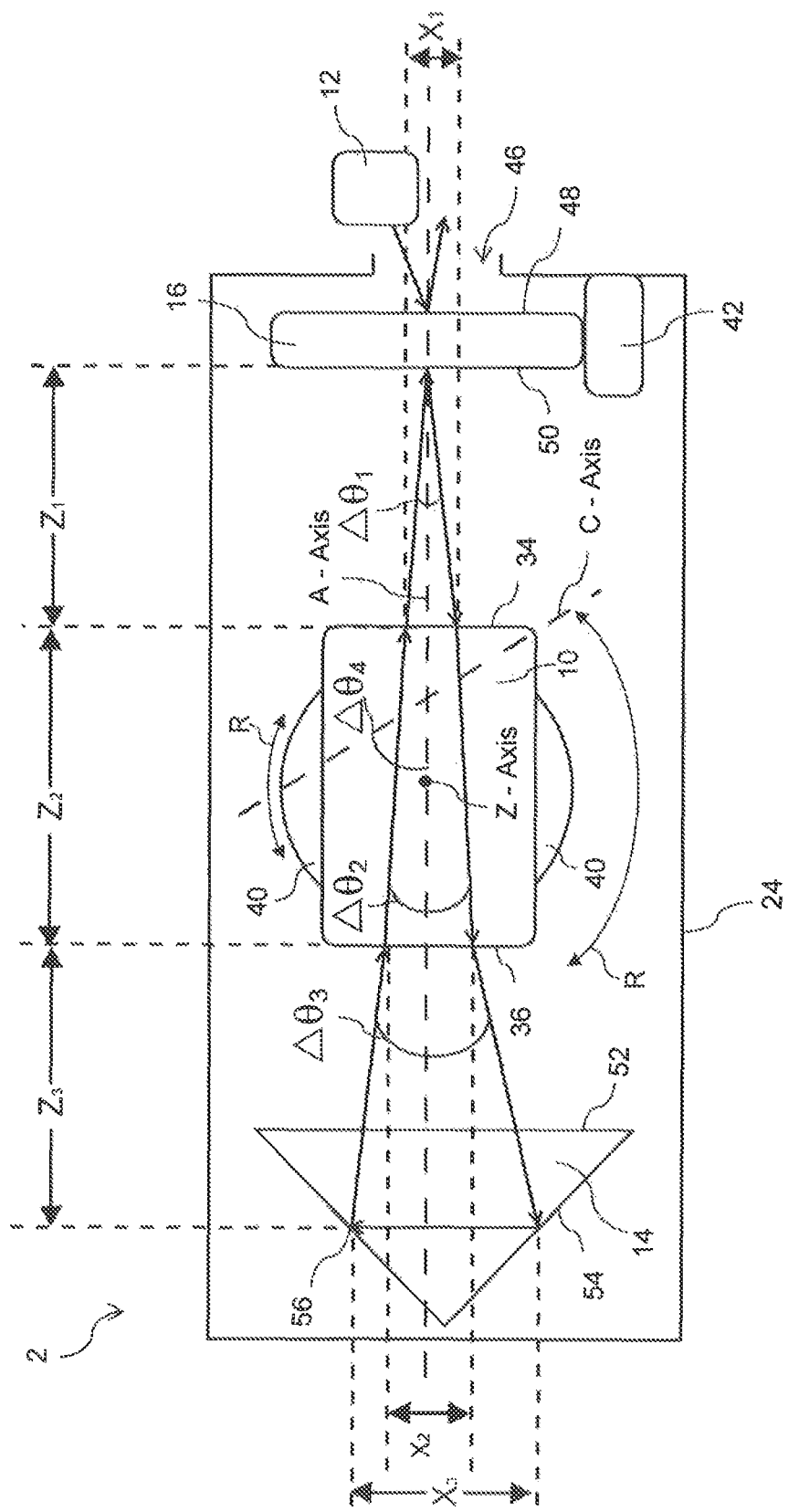
FIG. 2 is a diagrammatic drawing of the present invention, according to a second embodiment, which includes the nonlinear optical crystal and an acute porro prism and a combined input-output coupler.

FIG. 2 is a diagrammatic representation of the present invention according to a second embodiment which includes, according to this embodiment, an the acute porro prism 14, the nonlinear optical crystal 10, and the input-output coupler 16. As shown in this Figure, the pump 12 is designed to "pump" or generate and emit a desired laser beam, i.e., a pump input beam $\lambda_p$ of a desired color, at a desired wavelength and frequency. The beam paths, as the pump input laser beam propagates or passes through the optical apparatus 2, are diagrammatically shown in this Figure. It is to be appreciated that, according to this embodiment, the point of entry of the input beam $\lambda_p$ is fundamentally the same as the exit point of each of the output beams. As noted above, the dimensions of the optical apparatus 2 will vary depending on the particular NLO crystal 10 utilized and the desired wavelengths of the output beams to be achieved by the optical apparatus 2.

Referring now to both of the figures, the present invention relates to an optical apparatus 2 which is designed to provide or generate several output light bands or beams along a single beam line so that each one of the generated light bands or beams is aligned and collinear with one another and the pump input beam $\lambda_p$ as all of these light bands or beams exit the optical apparatus 2. The present invention, according to a first embodiment, generally comprises five main components, namely, the pump 12, the NLO crystal 10, the input coupler 6, the fold mirror 4, and the output coupler 8.

The second embodiment, on the other hand, generally comprises four main components, namely, the pump 12, the NLO crystal 10, the acute porro prism 14, and the combined input-output coupler 16. In each embodiment, the pump 12 generates and supplies the pump input beam $\lambda_p$, i.e., a single input beam of a desired color and wavelength, from which the optical apparatus 2 is designed to generate four new spectral bands, for a total of five output bands which includes a remaining portion of the original pump input beam $\lambda_p$.

The present invention is useful for any application where up to five spectral bands are desired as output bands or beams which are to be generated by non-linear optical parametric conversion. The optical apparatus 2, according to the present invention, is particularly useful if greater than three bands are desired or if three bands are desired but cannot be generated with a single OPO because the desired bands do not satisfy the conservation of energy intrinsic to the operation of an OPO. In particular, any application where one option is to drive two separate OPOs with a single pump 12 could potentially combine the two OPOs into a single device with a single NLO crystal 10 using this technique. A variety of different input pumps may be used to achieve a variety of different output bands.

According to the invention, the pump input beam $\lambda_p$, supplied by the pump 12, makes at least two passes through the NLO crystal 10, namely, at least a first pass in a first direction and a second pass in a second opposite direction. On the first pass of the pump input beam $\lambda_p$ through the NLO crystal 10, the NLO crystal 10 splits, divides and converts a portion of the pump input beam $\lambda_p$ into a first signal wavelength $\lambda_{s1}$ (near degeneracy) and a first idler wavelength $\lambda_{i1}$ (near degeneracy). As discussed in more detail below, the NLO crystal 10 also provides anti-reflection for all of the wavelengths involved in the second pass, including the pump input beam $\lambda_p$, the first signal wavelength $\lambda_{s1}$, the first idler wavelength $\lambda_{i1}$, a second signal wavelength $\lambda_{s2}$ and a second idler wavelength $\lambda_{i2}$. The resulting spectral bands of the first signal wavelength $\lambda_{s1}$ and the first idler wavelength $\lambda_{i1}$ are a function of the phase-matching angle, which is the angle between the central axis A of the optical apparatus 2 and the c-axis C of the NLO crystal 10, in FIG. 1 and in FIG. 2.

According to the first embodiment of the present invention, as illustrated in FIG. 1, all of the components are contained and enclosed within an exterior housing 24 which has a separate inlet opening 26 and a separate outlet opening 28. As generally shown in this Figure, the pump input beam $\lambda_p$ enters the optical apparatus 2 through the inlet opening 26 of the housing 24 and passes through a first surface 18 of the input coupler 6. This nonreflective first surface 18 of the input coupler 6 functions to anti-reflect, e.g., allow passage of, the pump wavelength $\lambda_p$, therethrough and exit from a second surface 30 of the input coupler 6.

The pump input beam $\lambda_p$ then propagates towards, and is totally reflected by, a first reflective surface 20 of the fold mirror 4, which is coated with a conventional reflective coating to accomplish this. The first surface 20 of the fold mirror 4 then reflects the pump input beam $\lambda_p$ at a desired angle toward a first surface 34 of the nonlinear optical crystal 10.

As the pump input beam $\lambda_p$ propagates toward the nonlinear optical crystal 10, the pump input beam $\lambda_p$ forms a small angle, e.g., between 1-4 degrees for example, with the central axis A of the apparatus 2. As the pump input beam $\lambda_p$ first passes through the nonlinear optical crystal 10, a portion of the pump input beam $\lambda_p$ is split and converted into two additional separate beams, namely, the first signal wavelength $\lambda_{s1}$ and the first idler wavelength $\lambda_{i1}$ which each have a desired color and wavelength. The two separate beams, along with a remaining portion of the original pump input beam $\lambda_p$, then exit from the second surface 36 of the nonlinear optical crystal 10 and propagate toward the output coupler 8.

A first surface 22 of the output coupler 8 is coated with a coating which permits an unreflected portion of the first signal wavelength $\lambda_{s1}$, the first idler wavelength $\lambda_{i1}$, and the pump input beam $\lambda_p$ (as well as a second signal wavelength $\lambda_{s2}$ and a second idler wavelength $\lambda_{i2}$ discussed below) to pass therethrough. The unreflected portion of the light exits from a second surface 44 of the output coupler 8 and passes through the outlet opening 28 of the optical apparatus 2 for use in a desired military or space application. The first surface 22 of the output coupler 8 also reflects a remaining portion of the light beams of the first signal wavelength $\lambda_{s1}$, the first idler wavelength $\lambda_{i1}$—and the pump input beam $\lambda_p$ back toward the second surface 36 of the nonlinear optical crystal 10. This remaining portion of the first signal wavelength $\lambda_{s1}$, the first idler wavelength $\lambda_{i1}$ and the input beam $\lambda_p$ then enters the second surface 36 of the nonlinear optical crystal 10 and again passes therethrough.

During this second pass, the remaining portion of the pump input beam $\lambda_p$ enters the second surface 36 of the nonlinear optical crystal 10 at a slightly different angle, e.g., by a few degrees or so, relative to the c-axis of the nonlinear optical crystal 10, than the first pass through the nonlinear optical crystal 10. This causes a further portion of the remaining pump input beam $\lambda_p$ to split and convert into and form a second signal wavelength $\lambda_{s2}$ (off degeneracy) and a second idler wavelength $\lambda_{i2}$ (off degeneracy), each having a desired color and wavelength.

The light beams, now comprises the remaining portion of the first signal wavelength $\lambda_{s1}$, the first idler wavelength $\lambda_{i1}$ and the input beam $\lambda_p$ and the newly generated second signal wavelength $\lambda_{s2}$ and second idler wavelength $\lambda_{i2}$. Each one of these beams then propagates toward the input coupler 6. The resulting spectral bands of the second signal $\lambda_{s2}$ and the second idler $\lambda_{i2}$ are a function of the phase-matching angle, which is the angle between the central axis A of the apparatus 2 and the c-axis. An important and key aspect is that on the second pass of the input beam $\lambda_p$ through the NLO crystal 10, the phase-matching angle will be slightly different than on the first pass because the beam line forms a steep triangle with the NLO crystal 10 straddling both long sides of the triangle. The geometry of the ring (i.e., triangle) is designed and engineered to produce the desired difference in the two phase-matching angles that is required in order to produce the desired spectral bands, e.g., a total of four additional bands along with a remaining portion of the initial input beam $\lambda_p$.

As previously discussed, the second surface 30 of the input coupler 6 has a nonreflective function, e.g., allows passage of only the pump wavelength $\lambda_p$ therethrough. Thus, an antireflective coating, on the second surface 30 of the input coupler 6, permits the depleted pump input beam $\lambda_p$ to pass therethrough and exit from the first surface 18 of the input coupler 6 and be removed, e.g., absorbed by a light trap 70 for example.

However, so as to prevent the loss of the other wavelengths, namely, the first signal wavelength $\lambda_{s1}$, the first idler wavelength $\lambda_{i1}$, the second signal wavelength $\lambda_{s2}$ and the second idler wavelength $\lambda_{i2}$, the second surface 30 of the input coupler 6 is highly reflective for at least each one of those wavelengths. This may be achieved by providing the second surface 30 with a coating which is highly reflective for each of the first signal wavelength $\lambda_{s1}$, the first idler wavelength $\lambda_{i1}$, the second signal wavelength $\lambda_{s2}$ and the second idler wavelength $\lambda_{i2}$, but not generally the pump input beam $\lambda_p$. Thus, each of the separate beams, namely, the first signal wavelength $\lambda_{s1}$, the first idler wavelength $\lambda_{i1}$, the second signal wavelength $\lambda_{s2}$, and the second idler wavelength $\lambda_{i2}$ are generally completely reflected by the second surface 30 of the input coupler 6. Each of these beams is then directed toward the fold mirror 4 along with the additional pump input beam $\lambda_p$, from the pump 12 which passes through the first and second surfaces 18, 30 of the input coupler 6, and propagates toward the fold mirror 4.

In the example shown in FIG. 1, the pump input beam $\lambda_p$ and a returning remainder of the pump input beam $\lambda_p$ together form an angle $\Delta\theta_3=6.6°=115$ mrad with respect to the central axis A of the apparatus 2. As described above, the reflective coating on the first surface 20 of the fold mirror 4 reflects each one of these light beams toward the first surface 34 of the nonlinear optical crystal 10. Preferably, the fold mirror 4 is a highly reflective mirror for substantially all of the wavelengths involved, including the pump input beam $\lambda_p$, the first signal wavelength $\lambda_{s1}$, the first idler wavelength $\lambda_{i1}$, the second signal wavelength $\lambda_{s2}$, and the second idler wavelength $\lambda_{i2}$.

After being reflected by the first surface 20 of the fold mirror 4 at the desired angle, the beams propagate toward the first surface 34 of the nonlinear optical crystal 10 for passing, progressing or propagating therethrough as discussed above. As the pump input beam $\lambda_p$ first passes through the nonlinear optical crystal 10, the pump input beam $\lambda_p$ is split or converted into two additional separate beams, namely, the first signal wavelength $\lambda_{s1}$ and the first idler wavelength $\lambda_{i1}$ which each have a desired color and wavelength. The two separate beams, along with the second signal wavelength $\lambda_{s2}$, and the second idler wavelength $\lambda_{i2}$ and a remaining portion of the original pump input beam $\lambda_p$, then exit from the second surface 36 of the nonlinear optical crystal 10 and propagate toward the output coupler 8. The unreflected portion of the first signal wavelength $\lambda_{s1}$, the first idler wavelength $\lambda_{i1}$, the second signal wavelength $\lambda_{s2}$, the second idler wavelength $\lambda_{i2}$ and the pump input beam $\lambda_p$, passes through the output coupler 8 and propagates for use in a desired military or space application. The remaining portion of the light beams of the first signal wavelength $\lambda_{s1}$, the first idler wavelength $\lambda_{i1}$, the second signal wavelength $\lambda_{s2}$, the second idler wavelength $\lambda_{i2}$ and the pump input beam $\lambda_p$ is reflected by the first surface 22 of the output coupler 8 back toward the second surface 36 of the nonlinear optical crystal 10 for a second pass, as described above.

After this second pass through the nonlinear optical crystal 10, each of the first signal wavelength $\lambda_{s1}$, the first idler wavelength $\lambda_{i1}$, the second signal wavelength $\lambda_{s2}$ and the second idler wavelength $\lambda_{i2}$, along with the remaining portion of the pump input beam $\lambda_p$ exits and propagates toward the second surface 30 of the input coupler 6 where the depleted pump input beam $\lambda_p$ pass therethrough while the remaining light is reflected toward the fold mirror 4. The above described process is then repeated for each first and second pass of the pump input beam $\lambda_p$ through the nonlinear optical crystal 10.

Each one of the first signal wavelength $\lambda_{s1}$, the first idler wavelength $\lambda_{i1}$, the second signal wavelength $\lambda_{s2}$, and the second idler wavelength $\lambda_{i2}$ and the remaining portion of the pump input beam $\lambda_p$ has a desired color, a desired wavelength and a desired frequency and are all coaligned with one another.

According to this embodiment, the spacing $Z_1$ between the first surface 22 of the output coupler 8 and the second surface 36 of the nonlinear optical crystal 10 can vary from application to application, depending upon the particular wavelengths of the first signal wavelength $\lambda_{s1}$, the first idler wavelength $\lambda_{i1}$, the second signal wavelength $\lambda_{s2}$ and the second idler wavelength $\lambda_{i2}$ to be achieved. For example, the spacing $Z_1$ between the first surface 22 of the output coupler 8 and the second surface 36 of the nonlinear optical crystal 10 can range from a few millimeters to 100 mm or so, for example, and is typically about 19 mm.

In addition, generally the spacing $Z_3$ between a first surface 34 of the nonlinear optical crystal 10 and the beam contact points of both the reflective (or second) surface 30 of the input coupler 6 and the first reflective surface 20 of the fold mirror 4 is generally fixed and typical such spacing $Z_3$ ranges between 5-20 mm or so, for example, and may about 13 mm.

The nonlinear optical crystal 10 typically has an overall length $Z_2$ of between about 10-20 mm, typically about 15 mm or so. Thus, according to this embodiment, the overall distance between the first surface 22 of the output coupler 8 and the beam contact point(s) on the second surface 30 of the input coupler 6 and on the first surface of the fold mirror 20 is represented by $Z_1+Z_2+Z_3$ which, in this embodiment, is: 15 mm+13 mm+19 mm=47 mm.

In addition, generally the spacing $X_3$, between the beam contact points on both of the reflective surface 30 of the input coupler 6 and the first reflective surface 20 of the fold mirror 4, is generally fixed and typical such spacing $X_3$ ranges between 1-10 mm or so, for example, and is generally about 4.2 mm. Likewise, generally the spacing $X_2$, between beam entry and beam exit points on the first surface 34 of the nonlinear optical crystal 10, is generally fixed and typical such spacing $X_2$ ranges between 1-5 mm or so, for example, and may be 2.7 mm. Similarly, generally the spacing $X_1$, between beam entry and beam exit points on the second surface 36 of the nonlinear optical crystal 10, is generally fixed and typical such spacing $X_1$ ranges between 1-5 mm or so, for example, and may be 2.2 mm, for example. It is to be appreciated, however, that any of the aforementioned spacings can vary, if desired, depending upon the particular application.

A rotatable support 40 is diagrammatically illustrated in FIG. 1. The nonlinear optical crystal 10 is first mounted on the rotatable support 40 in an orientation such that (1) the c-axis of the NLO crystal 10 is in the plane of the triangular resonator, and (2) such that the c-axis forms an angle with the central axis A of the apparatus 2 of approximately 45 to 60 degrees (depending on the desired phase-matching angle). This geometry gives rise to two slightly different critical angles based on the two passes of the pump beam through the NLO crystal 10. By arranging the nonlinear optical crystal 10 in this orientation, the c-axis of the nonlinear optical crystal 10 is arranged to interact with the pump input beam $\lambda_p$, and modify a portion of the pump input beam $\lambda_p$ into two desired beams, each having a desired color and wavelength, each time that the pump input beam $\lambda_p$ passes through the nonlinear optical crystal 10.

The nonlinear optical crystal 10 is typically mounted on the rotatable support 40 so that a nonlinear optical crystal 10 is rotatable (in the direction of double arrow R) along a z-axis which extends perpendicular or normal to the x-axis and the y-axis which, in FIGS. 1 and 2, the x-axis and the y-axis both lie in the plane of the paper of FIG. 1. The rotatable support 40 permits the nonlinear optical crystal 10 to be incrementally rotated by a very small angle $\Delta\theta_5$, relative to the central axis A of the apparatus 2, and thereby alter the colors and/or the wavelengths to be generated by the optical apparatus 2 as the pump input beam $\lambda_p$ passes therethrough. Such rotation of the nonlinear optical crystal 10, by manipulation of the rotatable support 40, slightly changes or alters the c-axis critical angle $\Delta\theta_4$ of the nonlinear optical crystal 10 with respect to the central axis A of the apparatus and thereby gradually changes or alters the color and/or the wavelengths to be achieved by the optical apparatus 2, according to the present invention, as the pump input beam $\lambda_p$ passes therethrough.

Preferably, the output coupler 8 is support upon an adjustable track or slide 42 (only diagrammatically shown) so that the relative position or spacing $Z_1$, between the first surface 22 of the output coupler 8 and the second surface 36 of the nonlinear optical crystal 10, can be easily varied. It is important that the first and second surfaces 22, 44 of the output coupler 8, during such adjustment, always remain perpendicular to the central axis A of the apparatus 2. Such adjustment of the position of the output coupler 8, relative to the nonlinear optical crystal 10, also assists with changing or altering the color and/or wavelengths to be achieved by the optical apparatus 2, according to the present invention.

The present invention uses a single pump input beam $\lambda_p$ to generate two output beams as a function of the c-axis of the nonlinear optical crystal 10. The combined output beams form a collection of five wavelengths, namely, the first signal wavelength $\lambda_{s1}$, the first idler wavelength $\lambda_{i1}$, the second signal wavelength $\lambda_{s2}$, the second idler wavelength $\lambda_{i2}$ and the pump input beam $\lambda_p$.

As previously discussed, the pump input beam $\lambda_p$ forms a small angle, e.g., between 1-4 degrees for example, with the central axis A of the apparatus 2. In the example shown in FIG. 1, this pump input beam $\lambda_p$ and a returning remainder of the pump input beam $\lambda_p$ together form an angle, $\Delta\theta_3$, with respect to the central axis A of the apparatus 2, where $\Delta\theta_3=\Delta\theta_1$, 6.6°=115 mrad. When passing through the NLO crystal 10, this pump input beam $\lambda_p$ and the returning remainder of the pump input beam $\lambda_p$ together form an angle, $\Delta\theta_2$, again with respect to the central axis A of the apparatus 2, where $\Delta\theta_2=2.1°=37$ mrad. After passing through the NLO crystal, this pump input beam $\lambda_p$ and a returning remainder of the pump input beam $\lambda_p$ together form an angle, $\Delta\theta_1$, with respect to the central axis A of the apparatus, where $\Delta\theta_3=\Delta\theta_1=6.6°=115$ mrad. Note that the c-axis of the nonlinear optical crystal 10 forms an angle $\Delta\theta_4$ with the central axis A of the apparatus, where $\Delta\theta_4=45$ to 60+5°.

It is to be appreciated that the location of the pump 12 in FIG. 1 may be switched from being aligning with input opening 26 to being aligned with the output opening 28, effectively reversing the function of input and output openings 26, 28. The important and key aspect is that on the second pass of the input beam $\lambda_p$ through the NLO crystal 10, the phase-matching angle will still be slightly different than on the first pass because the beam line again forms a steep triangle with the NLO crystal 10 straddling both long sides of the triangle. The geometry of the ring (i.e., triangle) is designed and engineered to produce the desired difference in the two phase-matching angles that is required in order to produce the desired spectral bands, e.g., a total of four additional bands along with a remaining portion of the initial input beam $\lambda_p$, without any unnecessary and unwanted distortion.

Turning now to FIG. 2, a second embodiment of the present invention will now be described. As this embodiment is very similar to the previously discussed embodiment, only the differences between this new embodiment and the previous embodiment will be discussed in detail while identical elements will be given identical reference numerals.

According to this embodiment generally shown in FIG. 2, the present invention comprises four main components, namely, the pump 12, the acute porro prism 14, the NLO crystal 10, and a combined input-output coupler 16. One difference between the first embodiment and the second embodiment is that instead of using two reflective surfaces on two separate components, namely, the fold mirror 4 and the input coupler 6, the second embodiment utilizes a single acute porro prism 14 which contains both reflective surfaces in a single component. In addition, a separate output coupler is eliminated and replaced with a combined input-output coupler 16. According to this embodiment, the pump input beam $\lambda_p$ enters and exits from a common input/output opening 46 formed within the housing 24, instead of entering via an input opening 26 and exiting through a separate output opening 28.

As with the first embodiment, all of the components of the present invention are contained and enclosed within an exterior housing 24 which, as noted above, has a common input/output opening 46. As generally shown in this Figure, the pump input beam $\lambda_p$ enters the optical apparatus 2 through the combined inlet/outlet opening 46 and passes through a first surface 48 of the input-output coupler 16. The pump input beam $\lambda_p$ forms a small angle, e.g., between 1-4 degrees for example, with the central axis A of the apparatus. The pump input beam $\lambda_p$ then, after exiting from a second surface 50 of the input-output coupler 16, propagates towards and enters a first surface 34 of the nonlinear optical crystal 10. As the pump input beam $\lambda_p$ makes its first pass through the nonlinear optical crystal 10, the pump input beam $\lambda_p$ is split into two separate beams, namely, the first signal wavelength $\lambda_{s1}$ and the first idler wavelength $\lambda_{i1}$ which each have a desired color and wavelength. The two separate beams then exit from the second surface 36 of the nonlinear optical crystal 10 and propagate, along with a remaining portion of the original pump input beam $\lambda_p$, toward and pass through a first surface 52 of the acute porro prism 14. Each of the separate beams, namely, the first signal wavelength $\lambda_{s1}$ and the first idler wavelength $\lambda_{i1}$ and the remaining portion of the input beam $\lambda_p$, are generally completely reflected by second and third surfaces 54, 56 of the acute porro prism 14, and eventually exit from the first surface 52 of the acute porro prism 14. The first signal wavelength $\lambda_{s1}$, the first idler wavelength $\lambda_{i1}$ and the remaining portion of the input beam $\lambda_p$, each then propagate toward the nonlinear optical crystal 10.

The reflected light enters the second surface 36 of the nonlinear optical crystal 10, this time at a slightly different angle, e.g., by a few degrees or so, relative to the c-axis of the nonlinear optical crystal 10, than the first pass through the nonlinear optical crystal 10 and commences passing therethrough. As the remaining portion of the input beam $\lambda_p$ again passes through the nonlinear optical crystal 10, such passage causes the pump input beam $\lambda_p$ to split into and form a second signal wavelength $\lambda_{s2}$, having a desired color and wavelength, and a second idler wavelength $\lambda_{i2}$, having a desired color and wavelength.

Each of the first signal wavelength $\lambda_{s1}$, the first idler wavelength $\lambda_{i1}$, the second signal wavelength $\lambda_{s2}$ and the second idler wavelength $\lambda_{i2}$ along with a remaining portion of the pump input beam $\lambda_p$ then exits from the first surface 34 of the nonlinear optical crystal 10. Each of these five beams then propagates toward the input-output coupler 16. These beams pass through the first and the second surfaces 48, 50 of the input-output coupler 16 and exit through the common input/output opening 46 of the housing 24. These beams, namely, the first signal wavelength $\lambda_{s1}$, the first idler wavelength $\lambda_{i1}$, the second signal wavelength $\lambda_{s2}$, the second idler wavelength $\lambda_{i2}$ along with the remaining portion of the pump input beam $\lambda_p$, then propagate away from the optical apparatus 2, at a very small angle relative to the central axis A of the apparatus 2, for use in a desired military or space application.

Each one of the first signal wavelength $\lambda_{s1}$, the first idler wavelength $\lambda_{i1}$, the second signal wavelength $\lambda_{s2}$, the second idler wavelength $\lambda_{i2}$ and the pump input beam $\lambda_p$ has a desired color, a desired wavelength and a desired frequency and are all coaligned with one another.

It is appreciated that, according to this second embodiment, the spacing $Z_1$, between the first surface 50 of the input-output coupler 16 and the second surface 36 of the nonlinear optical crystal 10 can vary from application to application, depending upon the particular wavelengths of the first signal wavelength, the first idler wavelength, the second signal wavelength, and the second idler wavelength to be achieved. For example, the spacing, $Z_1$, between the first surface 50 of the input-output coupler 16 and the second surface 36 of the nonlinear optical crystal 10, can range from a few millimeters to 1000 mm or so, for example.

In addition, generally the spacing between the first surface 52 of the prism 14 and the second surface 36 of the nonlinear optical crystal 10 is fixed and typically such spacing ranges between 5-10 mm or so, for example. This generally causes the spacing $Z_3$, between the beam contact points of second and third surfaces 56, 54 and the second surface 36 of the nonlinear optical crystal 10, to be fixed and, thus, typically such spacing $Z_3$ ranges between 5-15 mm or so, for example. It is to be appreciated, however, that any of the aforementioned spacings may vary, if desired, depending upon the particular application.

The nonlinear optical crystal 10 typically has a length $Z_2$, from the first surface to the second surface 34, 36, of between about 10-20 mm, or so. Thus, according to this second embodiment, the overall distance, between first surface 50 of the input-output coupler 16 and the beam contact points of the second and the third surfaces 54, 56 of the prism 14, is represented by $Z_1+Z_2+Z_3$ which, in this embodiment, ranges from about 16 mm to about 1,030 mm, e.g., 1 mm+10 mm+5 mm=16 mm to 1,000 mm+20 mm+10 mm=1,030 mm.

As with the previous embodiment, the nonlinear optical crystal 10 is mounted on the rotatable support 40 in an orientation such that (1) the c-axis of the NLO crystal 10 is in the plane of the triangular resonator, and (2) such that the c-axis forms an angle with the central axis A of the apparatus 2 of approximately 45 to 60 degrees (depending on the desired phase-matching angle). This geometry gives rise to two slightly different critical angles based on the two passes of the pump beam through the NLO crystal 10. By arranging the nonlinear optical crystal 10 in this orientation, the c-axis of the nonlinear optical crystal 10 is arranged to interact with the pump input beam $\lambda_p$, and modify a portion of the pump input beam $\lambda_p$ into two desired beams, each having a desired color and wavelength, each time that the pump input beam $\lambda_p$ passes through the nonlinear optical crystal 10.

The nonlinear optical crystal 10 is typically mounted on the rotatable support 40 so that a nonlinear optical crystal 10 is rotatable along a z-axis which extends perpendicular or normal to the x-axis and the y-axis, which both lie in the plane of the paper of FIG. 2. The rotatable support 40 permits the nonlinear optical crystal 10 to be incrementally rotated at a very small angle, relative to the central axis A of the apparatus 2, and thereby alter the colors and the wavelengths to be generated by the optical apparatus 2 as the pump input beam $\lambda_p$ passes therethrough. Such rotation of the nonlinear optical crystal 10, by manipulation of the rotatable support 40, changes or alters the critical angle of the nonlinear optical crystal 10 and thereby changes or alters the color and/or wavelengths to be achieved by the optical apparatus 2, according to the present invention, as the pump input beam $\lambda_p$ passes therethrough.

Preferably, the input/output coupler 16 is supported upon an adjustable track or slide 42 (only diagrammatically shown) so that the relative position or spacing $Z_1$, between the second surface 48 of the input/output coupler 16 and the second surface 36 of the nonlinear optical crystal 10, can be readily varied. It is important that the first and second surfaces 48, 50 of the input/output coupler 16, during such adjustment, always remain perpendicular to the central axis A of the apparatus 2. Such adjustment of the position of the input/output coupler 16 relative to the nonlinear optical crystal 10 also assists with changing or altering the color and/or wavelengths to be achieved by the optical apparatus 2 according to the present invention.

The acute porro prism 14 provides a broadband anti-reflection on each external face and total reflection on internal faces 54, 56 for all wavelengths involved. Since broadband anti-reflection dielectric coatings are much easier to design and produce than broadband high-reflection coating, the use of the prism 14 enhances the practicality of the requisite dielectric coatings by using total reflection on internal faces or surfaces 54, 56 to achieve broadband high reflection.

Furthermore, the prism 14 eliminates a degree of freedom of the optical apparatus 2 and hence simplifies the alignment of the optical components. It is to appreciated, however, instead of using an acute porro prism 14, a pair of mirrors may be utilized, without departing from the spirit and scope of the present invention, to reflect the light back to the nonlinear optical crystal 10 for a second pass therethrough. However, such mirrors need to be very precisely aligned in order to achieve the desired reflection and potentially mounted very close together in order to achieve the desired geometry. Modern optical fabrication techniques, such as a single-point diamond turning, make it possible to produce a single prism 14 with an arbitrary angle and very high precision. Therefore, incorporating the desired angle directly into a single component eliminates a potentially difficult alignment step that may be otherwise prevalent.

The input-output coupler 16 functions to anti-reflect the pump wavelength while partially reflecting the other wavelengths involved, including specifically the first signal wavelength $\lambda_{s1}$, the first idler wavelength $\lambda_{i1}$, the second signal wavelength $\lambda_{s2}$, the second idler wavelength $\lambda_{i2}$ and the pump input beam $\lambda_p$.

According to both embodiments, the present invention uses a single input beam $\lambda_p$ to generate at least two output beams as a function of the c-axis of the nonlinear optical crystal 10. The combined output beams are, at least, a collection of five wavelengths, namely, the first signal wavelength $\lambda_{s1}$, the first idler wavelength $\lambda_{i1}$, the second signal wavelength $\lambda_{s2}$, the second idler wavelength $\lambda_{i2}$ and the pump input beam $\lambda_p$.

The invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Therefore, the present invention should not be limited to any single embodiment, but rather construed in breadth and scope in accordance with the recitation of the appended claims.

Wherefore, I claim:

1. An optical apparatus for generating up to five light bands aligned on a single beam line, the optical apparatus comprising:
    a pump for generating a pump input beam and supplying the pump input beam to a first surface of a nonlinear optical crystal for generating a first signal wavelength and a first idler wavelength, as the pump input beam makes a first pass through the nonlinear optical crystal;
    an input coupler being arranged between the pump and the first surface of the nonlinear optical crystal;
    a pair of reflective surfaces being arranged for reflecting at least a remaining portion of the pump input beam, which passes through and exits from a second surface of the nonlinear optical crystal, back through the second surface of the nonlinear optical crystal for a second pass through the nonlinear optical crystal and generating a second signal wavelength and a second idler wavelength, which are both coaligned with the remaining portion of the pump input beam, the first signal wavelength and the first idler wavelength, and wherein an entrance angle of the pump input beam, relative to a central axis of the optical system, as the pump input beam enters the first surface of the nonlinear optical crystal for the first pass is different from an entrance angle of the pump input beam, relative to the central axis of the optical system, as the pump input beam enters the second surface of the nonlinear optical crystal for the second pass through the nonlinear optical crystal in order to generate the first signal wavelength, the first idler wavelength, the second signal wavelength and the second idler wavelength.

2. The optical apparatus according to claim 1, wherein nonlinear optical crystal is mounted on a rotatable support so that the nonlinear optical crystal is rotatable along a z-axis, which extends perpendicular to the central axis of the optical system, for permitting the nonlinear optical crystal to be incrementally rotated, relative to the central axis of the optical apparatus, and thereby alter a color and a wavelength of light to be generated by the optical apparatus as the pump input beam passes therethrough.

3. The optical apparatus according to claim 2, wherein the nonlinear optical crystal is arranged such that:
    (1) a c-axis of the nonlinear optical crystal lies in a plane of a triangular resonator, and
    (2) the c-axis forms an angle 2 of approximately 45 to 60 degrees with the central axis of the optical apparatus.

4. The optical apparatus according to claim 1, wherein the nonlinear optical crystal is arranged such that:

(1) a c-axis of the nonlinear optical crystal lies in a plane of a triangular resonator, and (2) the c-axis forms an angle 2 of approximately 45 to 60 degrees with the central axis of the optical apparatus.

5. The optical apparatus according to claim 3, wherein the pump input beam forms an angle of between 1-4 degrees with the central axis of the optical apparatus.

6. The optical apparatus according to claim 3, wherein the nonlinear optical crystal has a length, along the central axis of the optical apparatus, of between about 10 and about 20 mm.

7. The optical apparatus according to claim 3, wherein the optical apparatus further includes an output coupler and a fold mirror,
the input coupler, the output coupler, the fold mirror, the nonlinear optical crystal and the pair of reflective surfaces are all accommodated within a housing, and the housing has an inlet opening for supplying the pump input beam to the nonlinear optical crystal, and an outlet opening for discharging the first signal wavelength, the first idler wavelength, the second signal wavelength, the second idler wavelength and a remaining portion of the pump input beam from the optical apparatus.

8. The optical apparatus according to claim 3, wherein the input coupler comprises a combined output/input coupler, the pair of reflective surfaces are internal surfaces of a prism,
the combined output/input coupler, the nonlinear optical crystal and the prism are accommodated within a housing, and the housing has a combined inlet/outlet opening for supplying the pump input beam to the nonlinear optical crystal, and for discharging the first signal wavelength, the first idler wavelength, the second signal wavelength, the second idler wavelength and a remaining portion of the pump input beam from the optical apparatus.

9. The optical apparatus according to claim 3, wherein the optical apparatus includes an output coupler, and a geometry of the pair of reflective surfaces and the output coupler forms a steep triangle with the nonlinear optical crystal located between the pair of reflective surfaces and the output coupler so that the pump input beam makes first and second passes through the nonlinear optical crystal.

10. The optical apparatus according to claim 3, wherein the input coupler is a combined input/output coupler, and a geometry of the pair of reflective surfaces and the combined input/output coupler forms a steep triangle with the nonlinear optical crystal located between the pair of reflective surfaces and the combined input/output coupler so that the pump input beam makes first and second passes through the nonlinear optical crystal.

11. A method of generating up to five light bands aligned on a single beam line via an optical apparatus in which the optical apparatus comprises a pump for generating a pump input beam, a nonlinear optical crystal for generating a first signal wavelength and a first idler wavelength during a first pass therethrough, and generating a second signal wavelength and a second idler wavelength during a second pass therethrough, an input coupler arranged between the pump and the first surface of the nonlinear optical crystal, and a pair of reflective surfaces arranged for reflecting at least the pump input beam, the first signal wavelength and the first idler wavelength back through the second surface of the nonlinear optical crystal for a second pass through the nonlinear optical crystal, the method comprising:
generating the pump input beam via the pump;
supplying the pump input beam to a first surface of a nonlinear optical crystal for generating the first signal wavelength and the first idler wavelength, as the pump input beam makes the first pass through the nonlinear optical crystal; and
reflecting at least the pump input beam, the first signal wavelength and the first idler wavelength toward a second surface of the nonlinear optical crystal for the second pass through the nonlinear optical and generating, from the pump input beam, the second signal wavelength and the second idler wavelength during the second pass through the nonlinear optical crystal, and
wherein an entrance angle of the pump input beam, relative to a central axis of the optical system, as the pump input beam enters the first surface of the nonlinear optical crystal for the first pass is different from an entrance angle of the pump input beam, relative to the central axis of the optical system, as the pump input beam enters the second surface of the nonlinear optical crystal for the second pass through the nonlinear optical crystal in order to generate the first signal wavelength, the first idler wavelength, the second signal wavelength and the second idler wavelength.

\* \* \* \* \*